United States Patent [19]
Mola

[11] Patent Number: 5,476,353
[45] Date of Patent: Dec. 19, 1995

[54] TRAILER APPARATUS WITH ROTATING PLATFORM

[76] Inventor: Enrico Mola, Via Santuario 40, 25030 Castelmella (Prov. of Brescia), Italy

[21] Appl. No.: 324,561

[22] Filed: Oct. 18, 1994

[30] Foreign Application Priority Data

Oct. 27, 1993 [IT] Italy ................................ MI93A02288

[51] Int. Cl.⁶ .................................................. B65G 67/02
[52] U.S. Cl. ........................... 414/373; 53/253; 119/843;
414/397; 414/399; 414/392; 414/608; 414/343;
414/345; 414/507; 414/439; 414/508; 104/45
[58] Field of Search ..................................... 119/712, 843,
119/847, 848; 414/607, 608, 786, 373,
340, 343, 345, 434, 435, 349, 352, 439,
507, 390, 391, 392, 397, 395, 398, 518,
399, 400, 522, 482, 508, 523, 539, 473;
53/467, 249, 253, 250; 104/34, 45; 298/9

[56] References Cited

U.S. PATENT DOCUMENTS

| | | | |
|---|---|---|---|
| 1,612,901 | 1/1927 | Bates | 414/349 X |
| 2,186,848 | 1/1940 | Uhlir | 414/522 X |
| 2,385,025 | 9/1945 | Petnick | 414/345 |
| 3,318,613 | 5/1967 | House | 280/423.1 X |
| 3,419,282 | 12/1968 | Toews | 280/63 |
| 3,561,625 | 2/1971 | Dioguardi et al. | 414/345 X |
| 5,314,296 | 5/1994 | vom Stein | 414/608 X |

FOREIGN PATENT DOCUMENTS 1530659  3/1969  Germany ................................ 298/9

Primary Examiner—Frank E. Werner
Attorney, Agent, or Firm—Guido Modiano; Albert Josif

[57] ABSTRACT

Trailer-mounted apparatus of the type with a platform that can rotate on a central fifth wheel-like support with a vertical axis, particularly for the loading and handling of coop frames for poultry and the like, which includes: a substantially rectangular rotating platform which is driven by a motor; two fifth wheel-like supports with a vertical axis which are individually driven with a preset rotation angle by individual independent motors; and a horizontal secondary frame which is anchored to each one of the two end fifth wheels, and which has a retention sidewall for accommodating in succession a frame of coops to be loaded with poultry while another coop frame, arranged on the secondary frame that is rigidly associated with the opposite fifth wheel, is being loaded; each coop frame to be filled is arranged on the rotating secondary frame located opposite to the one that supports the coop frame during loading so that its longer longitudinal axis is orientated like the longitudinal axis of the platform by means of a fork-lift truck, so that the forks engage below the shorter side of said coop frame.

5 Claims, 6 Drawing Sheets

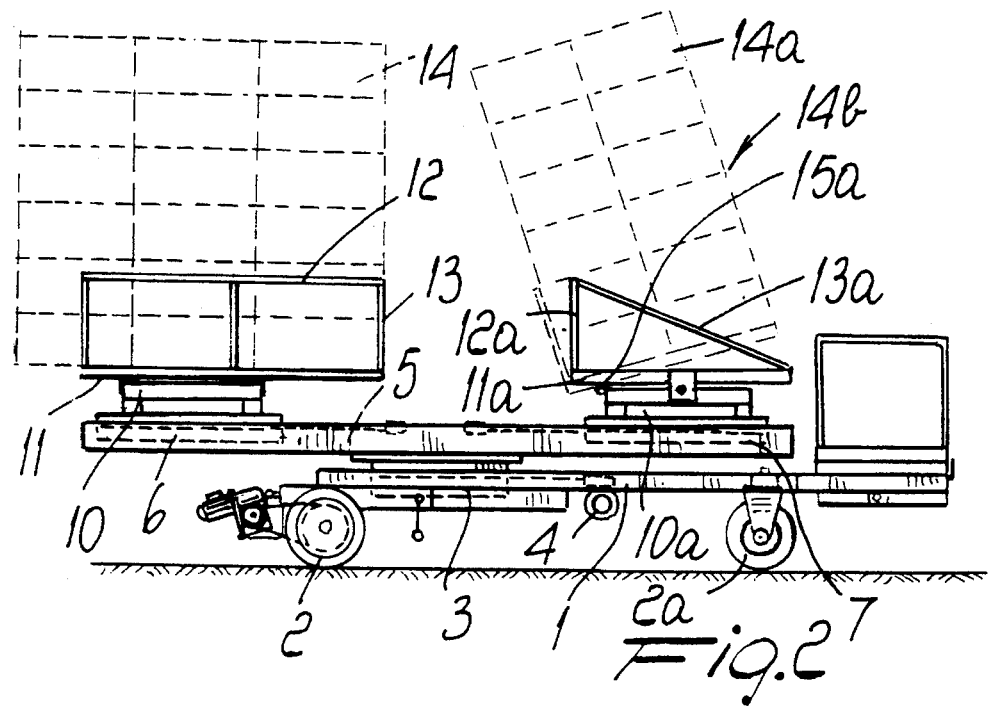
Fig. 2
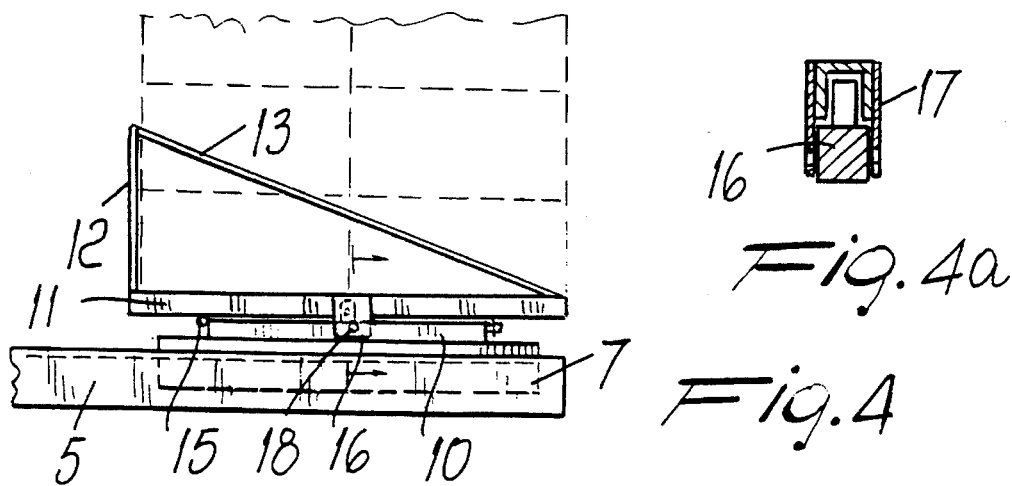
Fig. 4
Fig. 4a
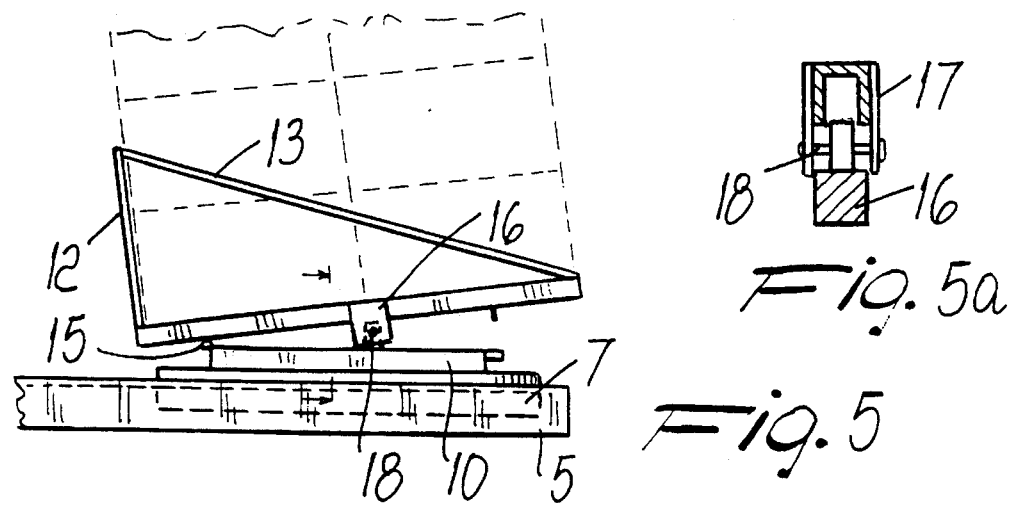
Fig. 5
Fig. 5a

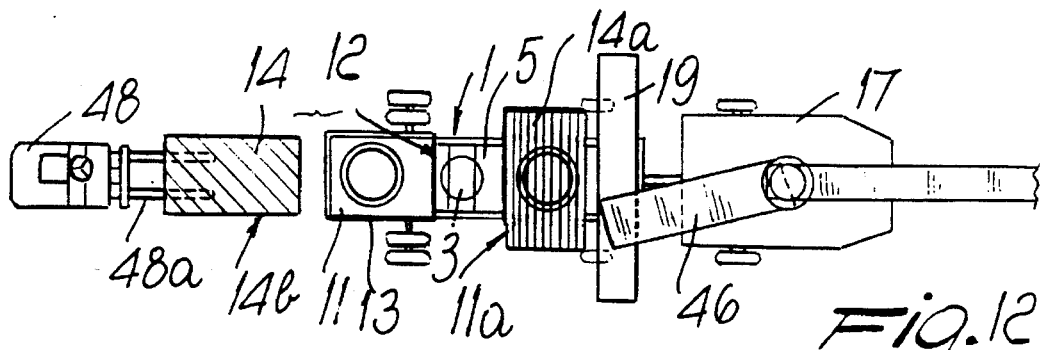
Fig. 12
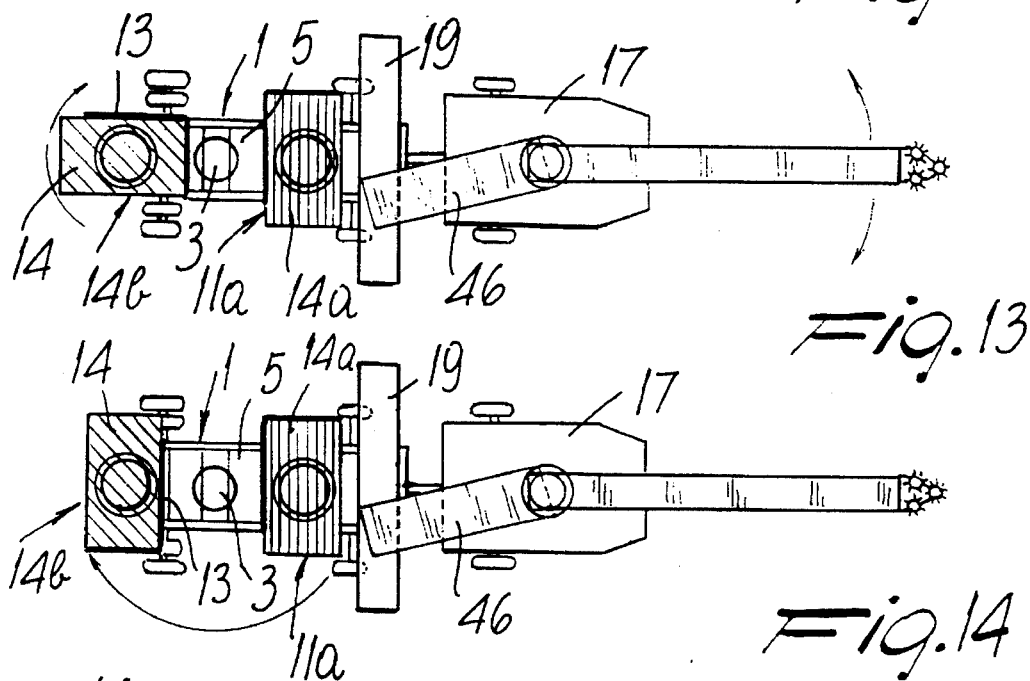
Fig. 13
Fig. 14
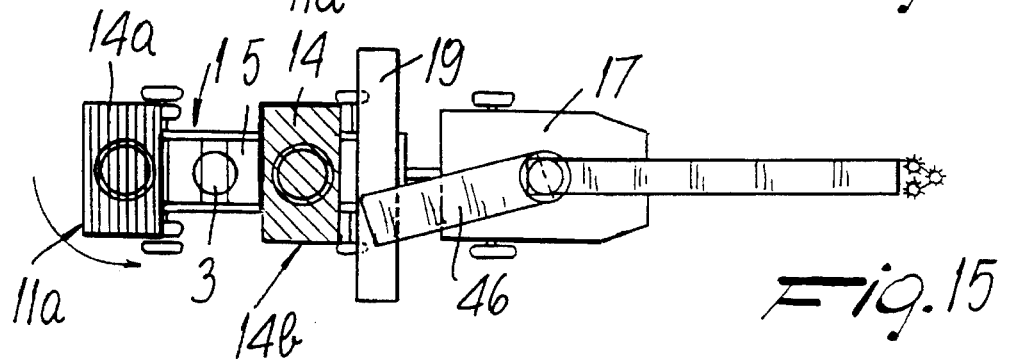
Fig. 15
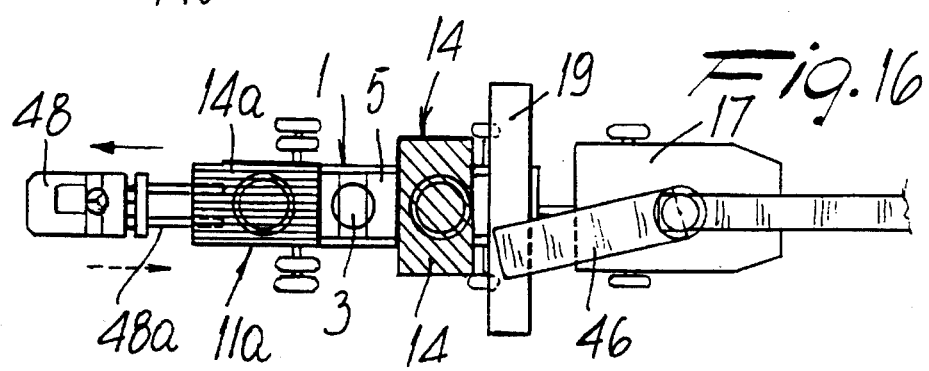
Fig. 16

TRAILER APPARATUS WITH ROTATING PLATFORM

BACKGROUND OF THE INVENTION

The present invention relates to a trailer-mounted apparatus with rotating platform for loading and handling, in succession, frames for stacked coops for poultry and the like taken continuously from farming pens and fed into the individual coops of each frame by gravity by means of conventional tubular conveyors or the like, arranged at an angle above the frames to be filled.

Small cages known as coops are conventionally used to transport and handle large quantities of poultry at the same time; these coops have a single openable door, have the shape of a parallelepiped with a rectangular base, and are stacked inside a cage-like retention frame in one or two rows of mutually adjacent stacks so that all the coop doors are on the same outer face of the retention frame.

The poultry, for example chickens, guinea fowl, and other similar farmyard animals, is normally loaded into the individual coops of the retention frame by means of a duct in which suction is formed; said duct sucks the poultry from a confined region of the pen where they are gathered by means of various gathering systems and then carries them into a container which is located at a given height from the ground; from there the poultry is sent, inside a tunnel-like duct or the like which is tilted and arranged adjacent to the opening of each coop, so that the poultry enters the coops by gravity.

Special towable trailers with a rotating platform are used to handle the empty or loaded coop frames; the frames are loaded onto said trailers and unloaded from them by means of fork-lift trucks.

The trailers are normally constituted by a rectangular chassis which is mounted on wheels and on which an equally rectangular horizontal platform is arranged; the platform can rotate on the trailer chassis by means of a support which is shaped like a fifth wheel that has a vertical axis, and the platform is generally moved by an electric motor and by an associated transmission belt.

A secondary frame is furthermore anchored to the two ends of the rotating platform and has a retention sidewall on which the coop frame is retained; by rotating the platform through 180° a frame containing empty coops loaded at one end of the platform can thus be moved into the loading position and another empty coop frame can be placed on the opposite end during loading; when loading of the first coop frame is complete, the loaded coop frame returns to the initial position by means of a further rotation of the platform through 180° and is removed from the initial position by means of a fork-lift truck; at the same time, another empty coop frame assumes the loading position.

In practice it has been observed that the handling of coop frames by using these known trailers with rotating platforms, while allowing correct arrangement and filling of the coops with the various kinds of poultry, nonetheless has some limitations and drawbacks when the coops are of the rectangular type and are necessarily loaded onto the rotating platform and unloaded from it so that their longer side, where the doors are located, is parallel to the longitudinal axis of the platform.

On the other hand, if the coop frames are lifted by inserting the forks from their shortest side, the correct arrangement of the coop frames on the platform, i.e. in which their vertical face which supports all the doors is arranged transversely to the median axis of the platform, is more complicated and entails longer downtimes.

The same drawbacks and limitations also occur during the unloading of the coop frames, with the coops filled with poultry, from the end of the rotating platform.

SUMMARY OF THE INVENTION

A principal object of the invention is to provide a trailer-mounted apparatus with a rotating platform for handling coop frames for poultry and the like which is conceived and configured so as to obviate the drawbacks of conventional trailers with rotating platforms and thus allow significant practical and economical advantages in the operations for loading and removing the coop frames.

Another object of the present invention is to provide an apparatus with rotating platform which is configured so as to allow to easily and correctly place and remove coop frames onto and from the rotating platform by using current fork-lift trucks without entailing difficulties in engaging the forks below the coop frames and without requiring difficult maneuvers on the part of the operator.

Another object of the invention is to provide an apparatus of the above specified type which has particular means for facilitating the insertion of the poultry in the individual coops, with the advantage of filling the coops correctly in a short time.

Another object of the invention is to provide a self-propelled trailer-mounted apparatus with rotating platform which is easy to use, highly reliable, and has a low cost and limited bulk.

With these and other objects in view, there is provided a trailer-mounted apparatus of the type with a platform that can rotate on a central fifth wheel-like support with a vertical axis, for the loading and handling, in succession, of coop frames for poultry and the like fed by gravity by means of tunnel-like ducts or the like, which includes a platform which is formed by a flat framework which is substantially rectangular, which can rotate about the fifth wheel-like support, and which is driven by a motor of its own. Two fifth wheel-like supports with a vertical axis are keyed at the opposite ends of the platform, are equidistant with respect to the rotation axis of the platform, and are individually moved with a preset rotation angle by individual independent motors. Additionally, a horizontal secondary frame which is anchored to each one of the two end fifth wheels is provided which has a retention sidewall for accommodating in succession a frame of coops to be loaded with poultry while another coop frame, arranged on the secondary frame that is rigidly associated with the opposite fifth wheel, is being loaded. Each frame of coops to be filled is arranged on the rotating secondary frame located opposite to the one that supports the coop frame during loading so that its longer longitudinal axis is orientated like the longitudinal axis of the platform by means of a fork-lift truck, so that the forks engage below the shorter side of the coop frame, so as to allow, by rotating the secondary frame thus loaded through 90° to arrange the coop frame so that the wall where the coop doors are located is arranged transversely with respect to the axis of the platform and then, after a 180° rotation of said platform, to correctly place the coop frame in loading position while the coop frame already loaded on the opposite secondary frame returns to the position in which it is ready for unloading by means of the fork-lift truck.

More particularly, the two opposite secondary frames, which are provided with sidewalls and are individually suitable to support a coop frame, are mounted so that they can be tilted towards the central fifth wheel of the platform and stopped by virtue of manual intervention means, so as to arrange the wall of the coop frame that is provided with the doors of stacked coops in an inclined position that is more suitable for introducing poultry in the individual coops.

The trailer with rotating platform is furthermore provided with drive means which act on at least one wheel of the trailer, which can be actuated by means of a manually-actuated kinematic system, and which allow the necessary movements of the trailer-mounted apparatus with respect to the poultry feeder duct or in any case make the apparatus self-propelled.

A walkway is furthermore associated with the front part of said trailer-mounted chassis that is directed towards the loading belt; this walkway lies transversely to the longitudinal axis of the trailer and is mounted so that it can be lifted and lowered, while remaining in a horizontal position, by means of a structure composed of crossed elements or the like that can be opened out in a scissor-like fashion by means of a hydraulic jack or the like.

BRIEF DESCRIPTION OF THE DRAWINGS

The particular characteristics and advantages of the present invention will become apparent from the following detailed description of a preferred embodiment thereof, given with reference to the accompanying drawings, which are provided only by way of non-limitative example and wherein:

FIG. 2 is a plan view of the apparatus with two coop frames arranged at the opposite ends of the rotating platform during the loading or unloading of one coop and the insertion of the other coop in the coop frame;

FIGS. 4 and 4a are views, respectively, of a sidewall-fitted secondary frame for supporting a coop frame that can be tilted with respect to the horizontal, and of the means for locking said coop frame in tilted position;

FIGS. 5 and 5a are views of said coop frame-supporting secondary frame of FIGS. 4 and 4a in horizontal position and in tilted position respectively;

FIGS. 12 to 16 are sequential plan views of the use and operation of the trailer-mounted apparatus for loading and handling coop frames according to the invention.

DESCRIPTION OF THE PREFERRED EMBODIMENTS

Figure 1:
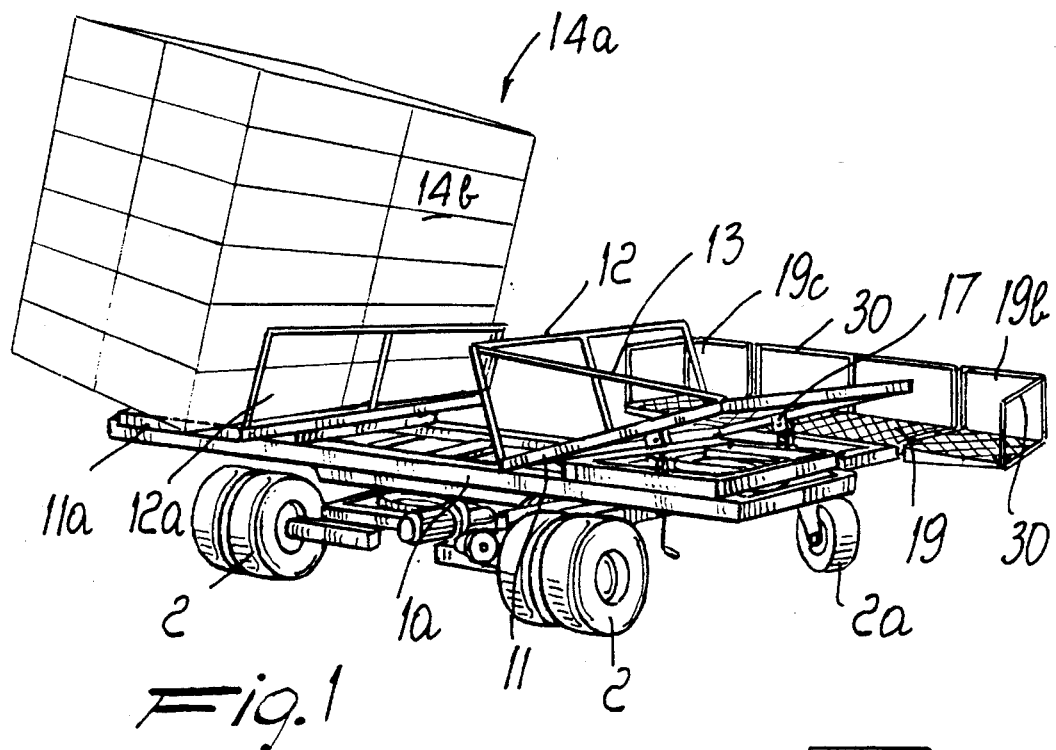
FIG. 1 is a perspective view of a trailer-mounted apparatus with rotating platform executed according to the invention during the rotation of the coops about the axis of the central fifth wheel of the platform.
Figure 3:
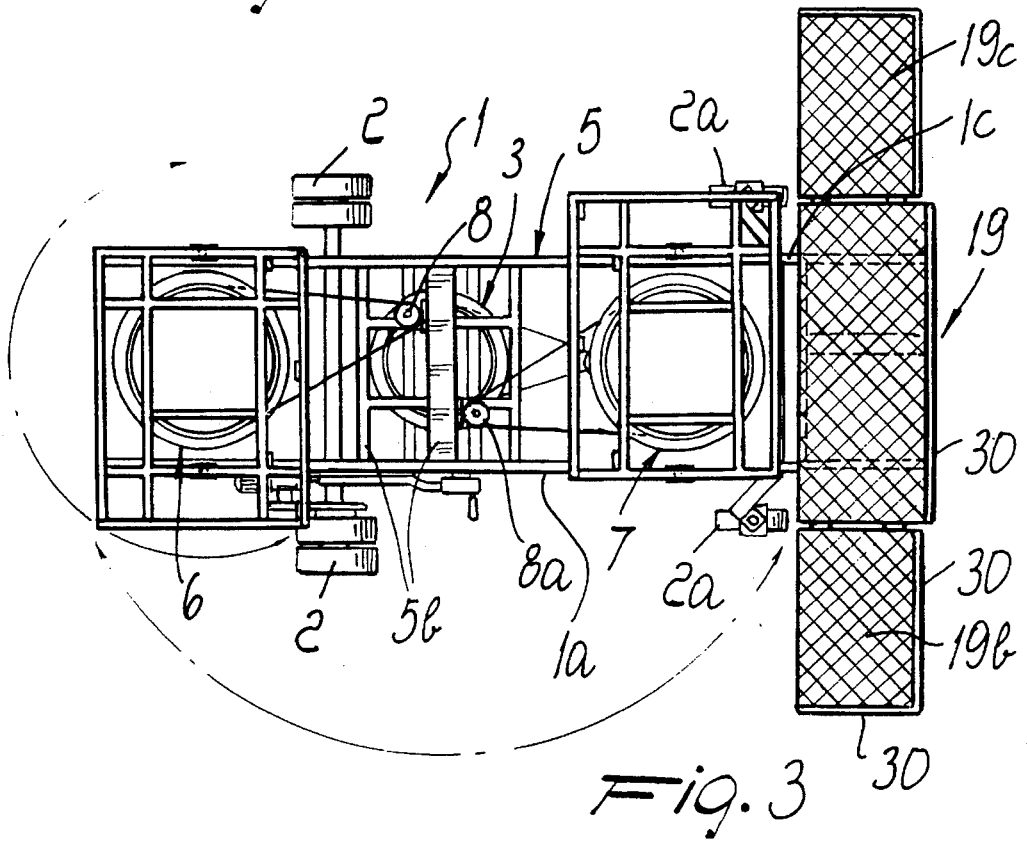
FIG. 3 is a side elevation view of the apparatus, with the platform arranged longitudinally on the trailer and the sidewall-fitted secondary frames arranged as in FIG. 1.
Figure 3A:
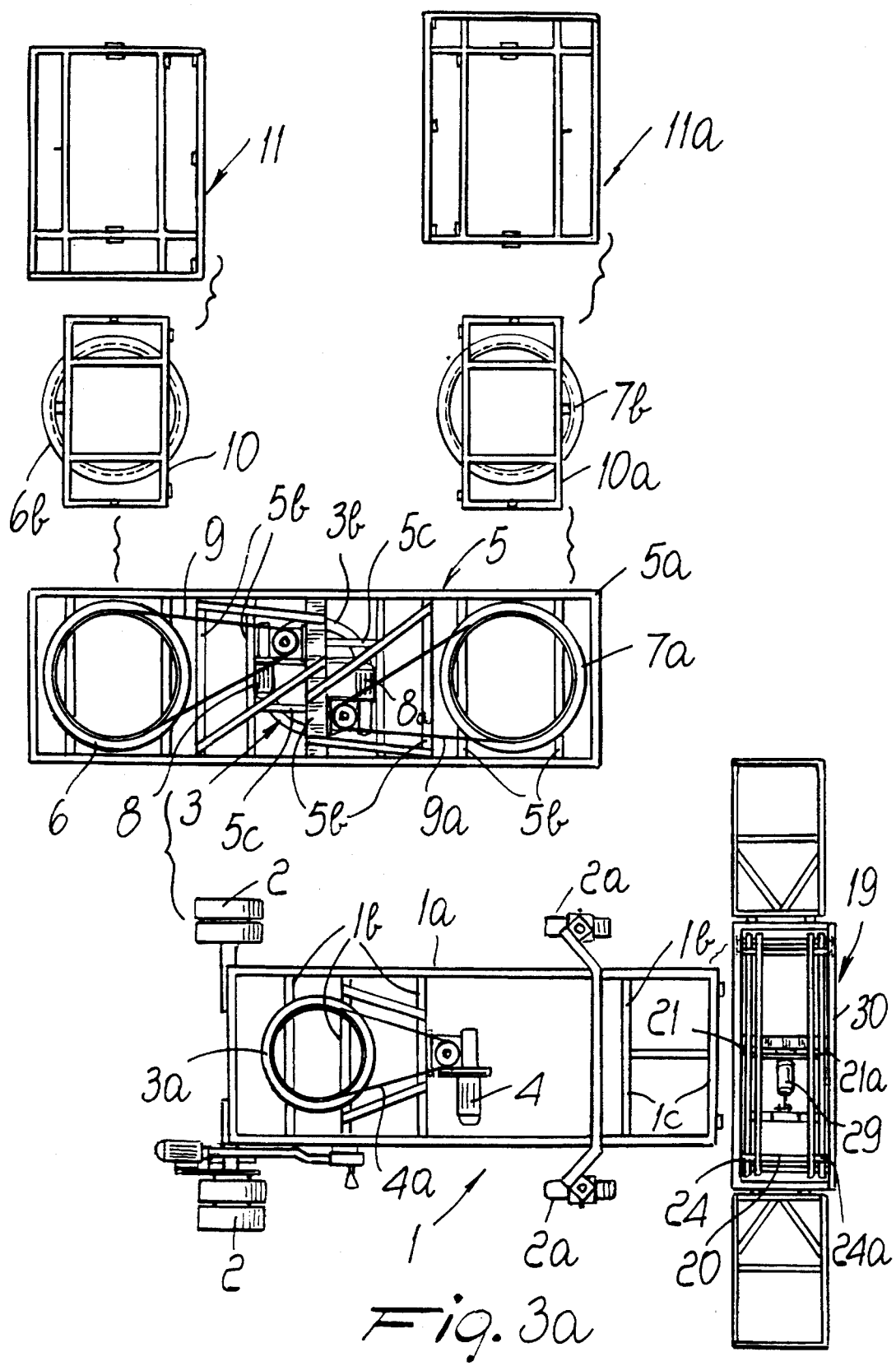
FIG. 3a is an exploded view of all the components of the apparatus shown in the above figures.
Figure 6:
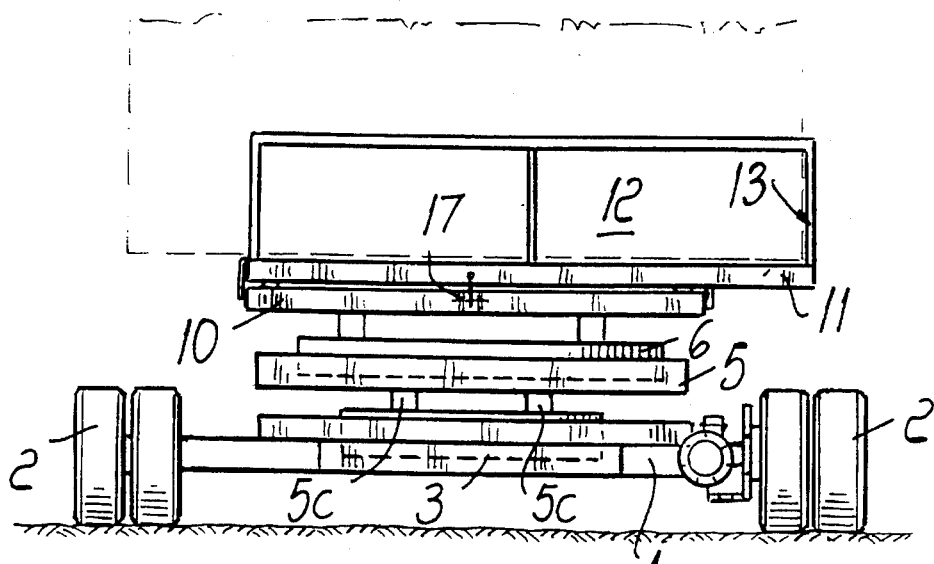
FIG. 6 is a rear elevation view of the trailer-mounted apparatus shown in the preceding figures.

With reference to FIGS. 1 to 3a, the apparatus according to the invention is substantially constituted (FIGS. 3 and 3a) by a trailer 1 formed by a rectangular chassis 1a, with stiffening cross-members 1b, which is mounted on four free wheels; the rear wheels 2 have a fixed axis, whereas the front ones 2a are castors or the like. The lower ring 3a of a fifth wheel-like support 3 is anchored to the cross-members 1b of the chassis 1a; said fifth wheel 3 is driven by its own an electric motor 4 by virtue of a belt 4a which is wound around pulleys.

The upper ring 3b is arranged so as to engage said ring 3a and is centrally rigidly coupled to the rotating platform 5, which is also constituted by a rectangular frame 5a (FIG. 3a) which is stiffened by cross-members 5b–5c.

Fifth wheels, respectively 6 and 7, are arranged at the opposite ends of the platform and are constituted by two lower rings 6a, 6b (FIG. 3a) and by two upper rings 7a, 7b.

Said fifth wheels 6 and 7 are driven respectively by electric motors 8 and 8a and by associated transmission belts 9, 9a.

Sub-frames, respectively 10 and 10a (FIGS. 3a and 3), are anchored to the upper rings 6b and 7b of the fifth wheels 6 and 7; a secondary frame, respectively 11 and 11a, is associated with each one of said sub-frames 10–10a so that it can be orientated; each one of said secondary frames has a sidewall, respectively 12 and 12a, which protrudes from the longer side of the respective secondary frame, and has an inclined traction element or connecting bar 13, 13a which is arranged between the sidewall and the plane of the respective secondary frame 11, 11a.

According to the present invention, the platform 5 can rotate through 180°, whereas the two sidewall-fitted secondary frames can rotate only through 90° starting from their opposite position, as shown clearly in FIG. 2.

The secondary frames 11–11a, each meant to support a coop frame, for example the ones designated by the reference numerals 14 and 14a in FIG. 2, are anchored to the underlying flat sub-frames 10–10a by virtue of hinge means 15, 15a which are interposed between the bottom surface of said secondary frames and the underlying sub-frames 10, 10a, so as to allow each coop frame-supporting secondary frame 11–11a to be tilted by a given fixed angle with respect to the plane of the platform, in order to arrange the coop frame, for example the one designated by the reference numeral 14a in FIG. 2, so that the wall 14b on which all the openable doors of the various coops of the frame is in an inclined position with respect to the poultry feeding tunnel and is therefore more suitable to facilitate coop filling.

Each secondary frame 11–11a can be locked in the preset tilted position by inserting a block 16 (FIGS. 4a–5a), which is rigidly coupled to the sub-frames 10–10a, within a fork or bracket 17 which is shaped like an inverted U and protrudes from the plane of the coop frame-supporting frame, and by subsequently mutually locking the block and the bracket by means of transverse pin 18. By removing the pin 18, the block 16 retracts further into the bracket 17, so that the secondary frames 11–11a rest horizontal on the underlying sub-frames 10 and 10a respectively.

The chassis 1a that constitutes the load-bearing surface of the platform 5 extends beyond the front wheels 2a (FIGS. 3a, 10, 11) with a cantilevered portion 1c; a device with crossing rods that can open and close in a scissorlike manner and are suitable to support a walkway 19, which allows the operator to monitor the insertion of the poultry into the coops, is located on said cantilevered portion.

Figure 10:
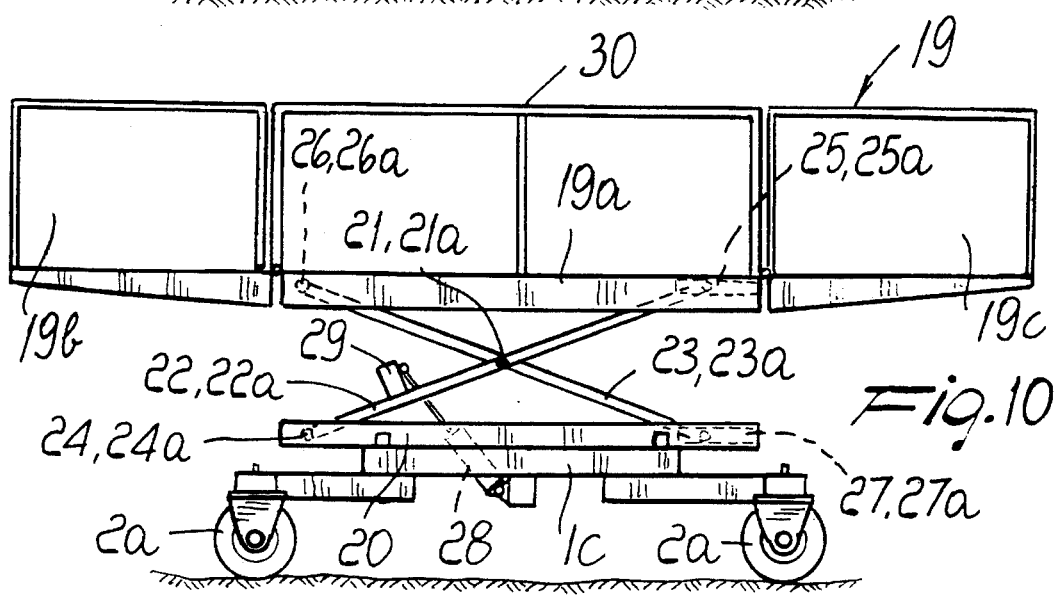

More specifically, said device is constituted by a rectangular sub-frame 20 which is rigidly coupled to the cantilevered portion 1c on which two pairs of rods 22–22a and 23–23a are pivoted; said rods cross each other and are mutually pivoted centrally at 21 and 21a, and the opposite ends of said pairs of crossed rods are pivoted to the base 19a of the walkway 19. In order to allow the scissorlike opening and closing of said pairs of crossed rods, one end of the rods 22–22a is connected to the subframe 20 by means of hinges 24–24a which have a fixed axis, whereas the opposite end is slidingly mounted within; slots 25–25a; similarly, the rods 23–23a are pivoted at 26–26a to the base 19a of the walkway so that their opposite end can slide within slots 27–27a formed in the sub-frame 20 (FIG. 10).

In order to open and close said crossed-rod device in a scissorlike fashion there is a hydraulic piston 28 which is interposed between a bar 29, which is rigidly coupled to the rods 24–24a, and the supporting sub-frame 20.

Figure 11:
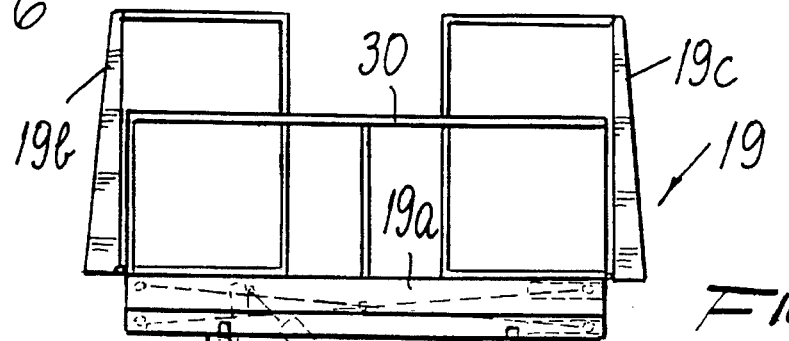
FIGS. 10 and 11 are views of a walkway which is associated with the apparatus shown in the preceding figures, shown respectively in raised position and in lowered position with respect to the plane of the rotating platform.

The walkway 19 furthermore has a conventional sidewall or railing 30 along its outer side and has two end portions 19b, 19c that can be raised at 90°, as shown in FIG. 11, so as to reduce the width occupied by the walkway during the maneuvers of the apparatus for positioning it during coop filling or for transferring it to parking areas.

Figure 7:
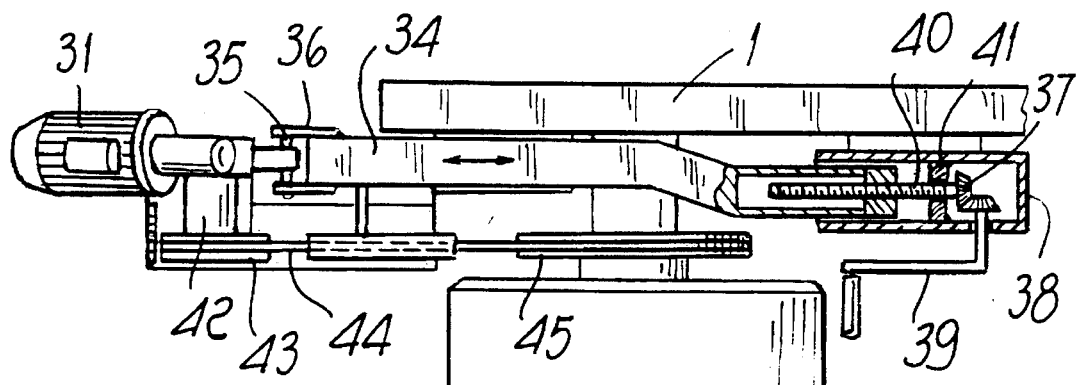
FIG. 7 is a top view of the manually-actuated actuation device for rotating one wheel of the trailer with rotating platform shown in the preceding figures.

In order to facilitate the movement of the above described apparatus over very short distances, the invention makes the entire apparatus self-propelled by means of an actuation device which uses an electric motor 31 (FIGS. 7, 8, and 9) which acts on a rear wheel; said device is constituted by a bracket 32 that has a slot 33 which is rigidly associated with the motor 31 and is pivoted to the end of a bar 34 which is movably mounted at the rear outer end of the supporting frame 1. The pivoting mechanism is constituted by a pivot 35 that is rigidly coupled to a fork 36 that protrudes from the end of the bar 34, which is allowed to move in both directions by means of a kinematic system 37 based on a bevel gear pair which is enclosed in a casing 38 that is rigidly coupled to the chassis 1a; said kinematic system actuates, by means of an external crank 39, a screw 40 that meshes within a fixed female thread 41 (FIG. 7). The motor 31 is pivoted at 41a to a sub-frame 41b that is rigidly coupled to the movable bar 34. A gear-based reduction unit 42 is furthermore associated with the motor 31, and a pulley 43 is keyed on its output shaft; said pulley 43 in turn drives, by means of a belt 44, a pulley 45 which is coaxial to the axis of the rear wheel 2.

Figure 8:
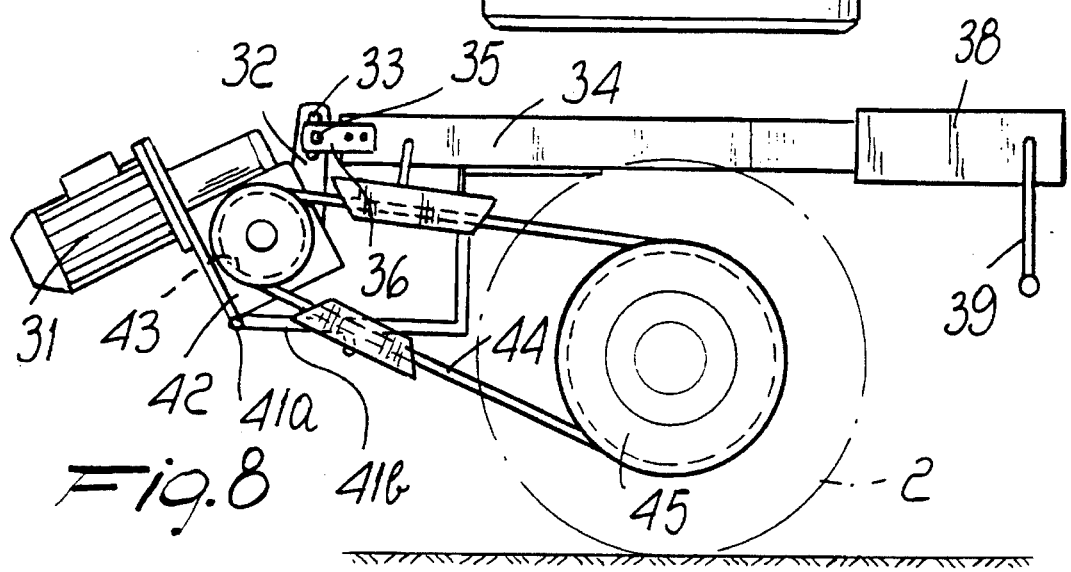
FIGS. 8 and 9 are side views of the same actuation device as in FIG. 7, shown respectively in the position in which it is disengaged from the wheel of the trailer and in the position in which it is engaged with it.
Figure 9:
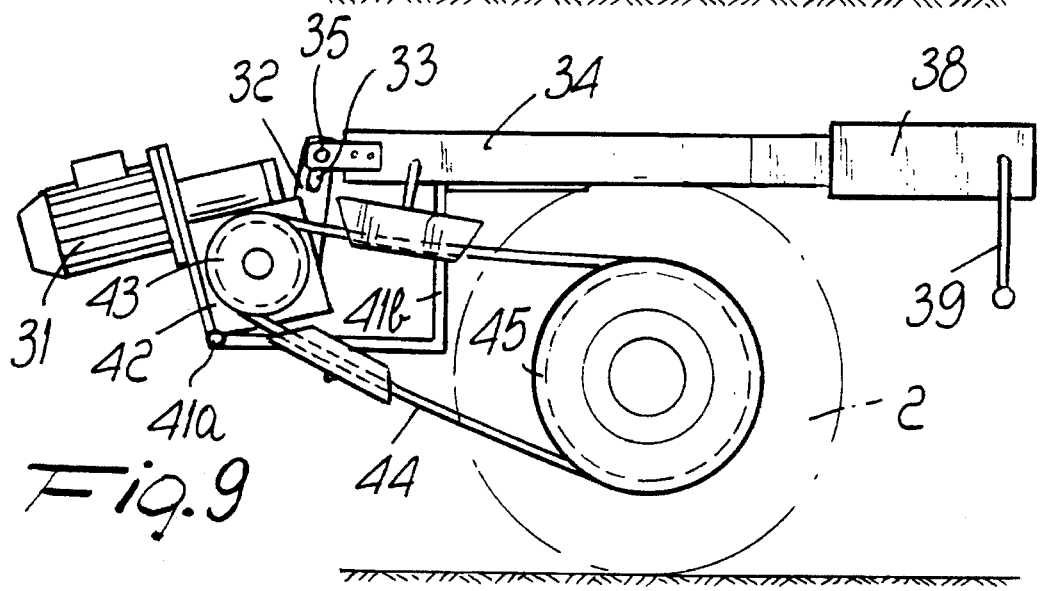

Therefore, by actuating the crank 39 so as to move the screw 40 toward the front wheels, the bar 34 is moved in the same direction and therefore the motor 31, by virtue of its pivoting to the base (41a), rotates and moves upward and simultaneously tensions the belt 44; therefore, when the motor is started the rear wheel rotates and thus allows the trailer-mounted apparatus to move slowly (FIG. 8). By actuating the crank in the opposite direction the bar 34 moves toward the rear part of the trailer and, by means of the bracket 32, allows the motor to rotate in reverse about its pivot 41a, thus slackening the belt 44 and therefore stopping the rotation of the wheel of the trailer.

The apparatus with rotating platform described above is used in practice as shown schematically in FIGS. 12 to 16.

Assuming, for the sake of convenience in explanation, that the apparatus is being loaded, as shown in FIG. 12, i.e. that a coop frame 14a is arranged on the platform proximate to the belt 46 along which the poultry arrives from the known suction apparatus, the operating cycle initially entails loading a coop frame 14 with empty coops by means of a fork-lift truck 48 of a known type.

During this loading step, the rotating platform 5 is arranged so that its longitudinal axis is parallel to the axis of the trailer 1, so that while the coop frame 14a is being loaded with chickens or the like, the opposite coop frame-supporting frame 11 is ready to receive the empty coop frame 14.

Said empty coop frame 14 is lifted by the fork-lift truck 48 by inserting the forks 48a at right angles to the shorter base side of the coop frame 14 and so that the face of the coop frame that is provided with the doors 14b is arranged, after loading on the rotating frame 11, on the free side by the inclined traction element 13.

The fork-lift truck moves the coop frame axially with respect to the apparatus (FIG. 12) and places it on the rotating frame 11 as shown in FIG. 13. By then rotating the rotatable frame 11 clockwise through 90° the coop frame 14 assumes the position of FIG. 14, in which the side provided with the doors 14a is on the outside and is parallel to the face of the coop frame 14a that is being filled.

At this point, by rotating the platform 5 through 180° in either direction, the loaded coop frame 14a assumes the unloading position and the empty coop frame 14 assumes the loading position, as shown in FIG. 15. It should also be specified that the rotation of the coop frame through 90° can occur while the platform rotates through 180° thus reducing the time required for the operation.

While the coop frame 14 is being filled, the rotating secondary frame 11a which supports the loaded coop frame 14a is rotated by 90° so as to arrange said loaded coop frame in the position in which it can be lifted and removed by the fork-lift truck, as shown in FIG. 16.

After unloading, the rotating secondary frame 11a is in the position for correctly receiving an empty coop frame while the coop frame 14 is being loaded; this allows to resume the cycle for loading multiple coop frames one after the other.

The above description shows that the intended aim and objects and the considerable practical and economical advantages have been achieved.

Structurally and functionally equivalent modifications and variations may of course be performed in the practical embodiment of the invention, as described according to a preferred practical embodiment thereof, without abandoning the protective scope of said invention.

What is claimed is:

1. Trailer-mounted apparatus with a platform that can rotate on a central fifth wheel-like support with a vertical axis, for loading and handling, in succession, of coop frames for poultry and the like fed by gravity in a known manner, comprising: the platform being formed by a flat framework which is substantially rectangular and is rotatably supported about said fifth wheel-like support, and is driven by a motor; two fifth wheel-like supports, each support having a vertical axis and individually movable with a preset rotation angle by individual independent motors; and a horizontal secondary frame being anchored to each one of said two end fifth wheels and having a retention sidewall for accommodating in succession the frame of coops to be loaded with poultry while another coop frame, arranged on the secondary frame that is rigidly associated with the opposite fifth wheel, is being loaded; thereby each frame of coops to be filled being arrangeable on the rotating secondary frame located opposite to the one that supports the coop frame during loading so that a longer longitudinal axis thereof is orientated like a longitudinal axis of the platform by means of a fork-lift truck, so that the forks may engage below a shorter side of said coop frame, so as to allow, by rotating the secondary frame thus loaded through 90°, to arrange the coop frame so that a wall where the coop doors are located is arranged transversely with respect to the axis of the platform and then, after a 180° rotation of said platform, to correctly place the coop frame in loading position while the coop frame already loaded on the opposite secondary frame returns to a position in which it is ready for unloading by means of said fork-lift truck.

2. Apparatus according to claim 1, wherein each one of said two opposite sidewall-fitted secondary frames is suitable to support the coop frame, said secondary frames being mounted so that they can be inclined toward the central fifth wheel of the platform and be stopped by virtue of manual-intervention means, so as to arrange the wall of the coop frame that is provided with the doors of stacked coops in an inclined position which is more suitable for introducing the poultry in individual coops.

3. Apparatus according to claim 1, wherein said trailer with rotating platform has drive means which act on at least one wheel of said trailer and can be actuated by means of a manually-actuated kinematic system, thereby for allowing necessary movements of the trailer-mounted apparatus with respect to a poultry feeding duct and making said apparatus self-propelled.

4. Apparatus according to claim 3, wherein said manually-actuated kinematic system for actuating a rear wheel of the trailer is constituted by a set of gears which are closed within a casing that is rigidly coupled to the trailer and can be operated by means of an external crank, said gears moving in either direction a horizontal bar an end of which is rotatably connected to an electric gearmotor which is pivoted below a structure that is rigidly coupled to the trailer, so as to transmit motion to said wheel by means of a belt or the like, the movement of said bar in one direction tensioning said belt and thus rotating said wheel, the movement in the opposite direction slackening said belt and consequently stopping the wheel.

5. Apparatus according to claim 1, wherein a walkway is anchored to a front part of said trailer-mounted frame, said walkway having sidewalls which are arranged outwardly and transversely to a longitudinal axis of said trailer, and the walkway being mounted so that it can be lifted and lowered, with respect to a plane of the platform, by virtue of pairs of crossed elements which can be spaced mutually apart in a scissorlike manner and which are interposed between the trailer frame and a base plane of said walkway, and which are actuated by a hydraulic piston or the like.

* * * * *